United States Patent [19]

Bashyam

[11] Patent Number: 5,773,721

[45] Date of Patent: Jun. 30, 1998

[54] LASER BEAM AIMING APPARATUS FOR ULTRASONIC INSPECTION

[75] Inventor: Manohar Bashyam, West Chester, Ohio

[73] Assignee: General Electric Company, Cincinnati, Ohio

[21] Appl. No.: 690,654

[22] Filed: Jul. 31, 1996

[51] Int. Cl.$^6$ ..................................................... G01D 5/32
[52] U.S. Cl. ................................. 73/596; 73/649; 73/570; 73/DIG. 1; 73/655; 128/662.03
[58] Field of Search .............................. 73/601, 618, 620, 73/627, 653, 655, 628, 644, 633, 634, 649, 596, 570, DIG. 1; 128/662.03; 250/491.1, 559.3; 362/121; 42/103

[56] References Cited

U.S. PATENT DOCUMENTS

| | | |
|---|---|---|
| 3,063,290 | 11/1962 | Kaserman et al. . |
| 3,213,677 | 10/1965 | Maklary . |
| 3,371,660 | 3/1968 | Carlin . |
| 3,728,027 | 4/1973 | Watanabe . |
| 4,127,033 | 11/1978 | Warren et al. . |
| 4,339,952 | 7/1982 | Foster . |
| 4,399,822 | 8/1983 | Theumer ................................. 128/660 |
| 4,554,834 | 11/1985 | Prinz et al. . |
| 4,633,620 | 1/1987 | Lorenzi et al. . |
| 4,807,634 | 2/1989 | Enjoji et al. . |
| 5,107,709 | 4/1992 | McCarty . |
| 5,193,405 | 3/1993 | Oomichi et al. . |
| 5,235,858 | 8/1993 | Cueman et al. . |
| 5,402,235 | 3/1995 | Monchalin . |
| 5,457,997 | 10/1995 | Naruo et al. . |
| 5,525,796 | 6/1996 | Haake . |

OTHER PUBLICATIONS

"VLM3 Style 'LG' Visible Laser Module Generator Specifications", Applied Laser Systems, 1 page brochure.

"VLM3 Visible Laser Module Specifications", Applied Laser Systems, 1 page brochure.

*Primary Examiner*—Christine K. Oda
*Assistant Examiner*—Richard A. Moller
*Attorney, Agent, or Firm*—Andrew C. Hess; Nathan D. Herkamp

[57] ABSTRACT

An apparatus for aiming an ultrasonic beam to nondestructively test an object has an ultrasonic transducer for generating the ultrasonic beam having a beam axis and impinging the ultrasonic beam upon the object. The apparatus includes a laser aiming apparatus for directing at least one laser beam having a laser sight line substantially coaxial with the ultrasonic beam axis.

The laser aiming apparatus, in one embodiment of the invention, includes a cross-hair apparatus for generating a laser beam cross-hair having a center along the laser sight line. Another embodiment of the present invention provides an ultrasonic mirror apparatus for bending the ultrasonic beam and which has a mirror made of a material that is substantially transparent to the laser beam. A mounting apparatus is used for initially directing a single laser beam and the ultrasonic beam along two different co-planar axes on opposite sides of the mirror and to set the mirror to bend the ultrasonic beam and align its axis with the laser beam axis so that the laser beam and ultrasonic beam axes are substantially coaxial at the object.

21 Claims, 5 Drawing Sheets

LASER BEAM AIMING APPARATUS FOR ULTRASONIC INSPECTION

BACKGROUND OF THE INVENTION

1. Field of the Invention

The present invention relates to aiming an ultrasonic beam utilized in nondestructive examination (NDE) of objects. More particularly, the present invention relates to an apparatus for producing a laser beam generated crosshair or spot to accurately aim the ultrasonic beam.

2. Discussion of the Background Art

Ultrasonic nondestructive examination (NDE) has long been used to interrogate the internal characteristics of materials in nondestructive inspection procedures. NDE is used in the aircraft and gas turbine engine industry to inspect parts to determine flaws and material anomalies in parts without destroying the parts. Typically, a part is placed in a tank of fluid such as water and an ultrasonic transducer is passed over an area of the part that is to be inspected. The operator visibly controls the movement and positioning of the transducer using a motorized or robotic device that translates and tilts the transducer. Aiming of the invisible ultrasonic beam is left up to the operator who usually eyeballs the area to be examined and may have to make several scans to be sure the correct area has been examined. A scan plan may be used when performing the NDE but there is no visible indication as to where the beam is entering the inspection surface. Therefore, marking location of indications of anomalies is difficult and prone to human errors. There is no feedback to the operator while performing contour following or the scan plan as to where the beam is striking the part, thus, preventing the proper validation of the scan plan.

There has been a long time need to accurately determine the location of the ultrasonic beam at the point at which it strikes the object being examined or tested. U.S. Pat. No. 5,7107,709 pointed out that a spectrum of techniques had been used in an effort to identify the location of the invisible ultrasonic beam, generally without great accuracy and precision, and with substantial expense and complexity. The apparatus disclosed in U.S. Pat. No. 5,107,709 discloses an aiming devices for generating a focusable visible light beam having a focal point and a beam axis coaxial with an ultrasonic beam axis. This includes apparatus for adjusting the visible light beam's focal point such as a mirror spatially fixed relative to a lamp for redirecting and focusing the visible light beam at a predetermined fixed point. Also suggested is the use of two or more point light sources such as fiber optic cable fixtures which may be fixedly mounted in spaced quadrature relation to each other and in a position so that the visible aiming light they provide converge at a predetermined fixed point. This, however, is not sufficient for scanning or examining areas of objects that are not always at the same distance from the light source. This is particularly true of more general types of installations able to examine a variety of parts with variable topography such as gas turbine engine disks which have many features to be examined with different surface orientations and elevations. This is also not good for use in labs which may examine a great many different objects requiring a change or adjustment in the visible light beam. The present invention overcomes this problem by using laser beam generating apparatus to provide a laser beam line that is substantially coaxial with the axis of the ultrasonic beam.

SUMMARY OF THE INVENTION

An apparatus for aiming an ultrasonic beam to nondestructively test an object has an ultrasonic transducer for generating the ultrasonic beam having a beam axis and impinging the ultrasonic beam upon the object. The apparatus includes a laser aiming apparatus for directing at least one laser beam having a laser sight line substantially coaxial with the ultrasonic beam axis.

The laser aiming apparatus, in one embodiment of the invention, includes a cross-hair apparatus for generating a laser beam cross-hair having a center along the laser sight line. The cross-hair apparatus may use at least two laser beam devices to form a like number of laser beam cross-hair lines that intersect along the laser line, preferably, the laser beam devices are of the type which produce laser fan beams. A more particular embodiment includes a holder having an attachment apparatus for attaching the holder to the ultrasonic transducer apparatus and a securing apparatus to secure two of the laser beam devices to the holder. The holder, in a yet more particular embodiment, includes a plate and the transducer and laser beam devices have cylindrical housings which are disposed in circular apertures in the plate. A rotational securing apparatus may be used for fixing angular orientations of the cylindrical housings of the laser beam devices in the apertures. The rotational securing apparatus may be small matching flats on the cylindrical housings and circular apertures in the plate.

Yet another embodiment of the present invention provides an ultrasonic mirror apparatus for bending the ultrasonic beam and which has a mirror made of a material that is substantially transparent to the laser beam. A mounting apparatus is used for initially directing a single laser beam and the ultrasonic beam along two different co-planar axes on opposite sides of the mirror and to set the mirror to bend the ultrasonic beam and align its axis with the laser beam axis so that the laser beam and ultrasonic beam axes are substantially coaxial at the object. The mirror may be made of quartz such as glass and a spherically focused laser diode in a laser beam generator apparatus may be used for generating the laser beam with a circular crops-section.

The invention may be in the form of an ultrasonic scanning apparatus having a carrier with a multi axis motive apparatus to direct the ultrasonic beam to nondestructively test an object and the carrier has mounted upon it the ultrasonic transducer and any other above described laser aiming apparatus for generating at least one laser beam and a laser sight line substantially coaxial with the ultrasonic beam axis.

ADVANTAGES OF THE INVENTION

The present invention provides an advantage of allowing an operator to visibly and accurately aim an ultrasonic beam on an object or objects being examined without having to adjust the focus of the illuminating aiming device. This is particularly advantageous when used in situations where the distance from the ultrasonic transducer to the area being examined is changing during the examination as is distance from the light source used for visually aiming. This is also advantageous when used in an NDE with an ultrasonic apparatus in which the object is placed in a tank of fluid such as water during the examination when the ultrasonic beam is passed over an area of the object. The present invention provides the advantage of being able to ultrasonically scan a variety of parts with variable topography without having to adjust the focus of the illuminating light source.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
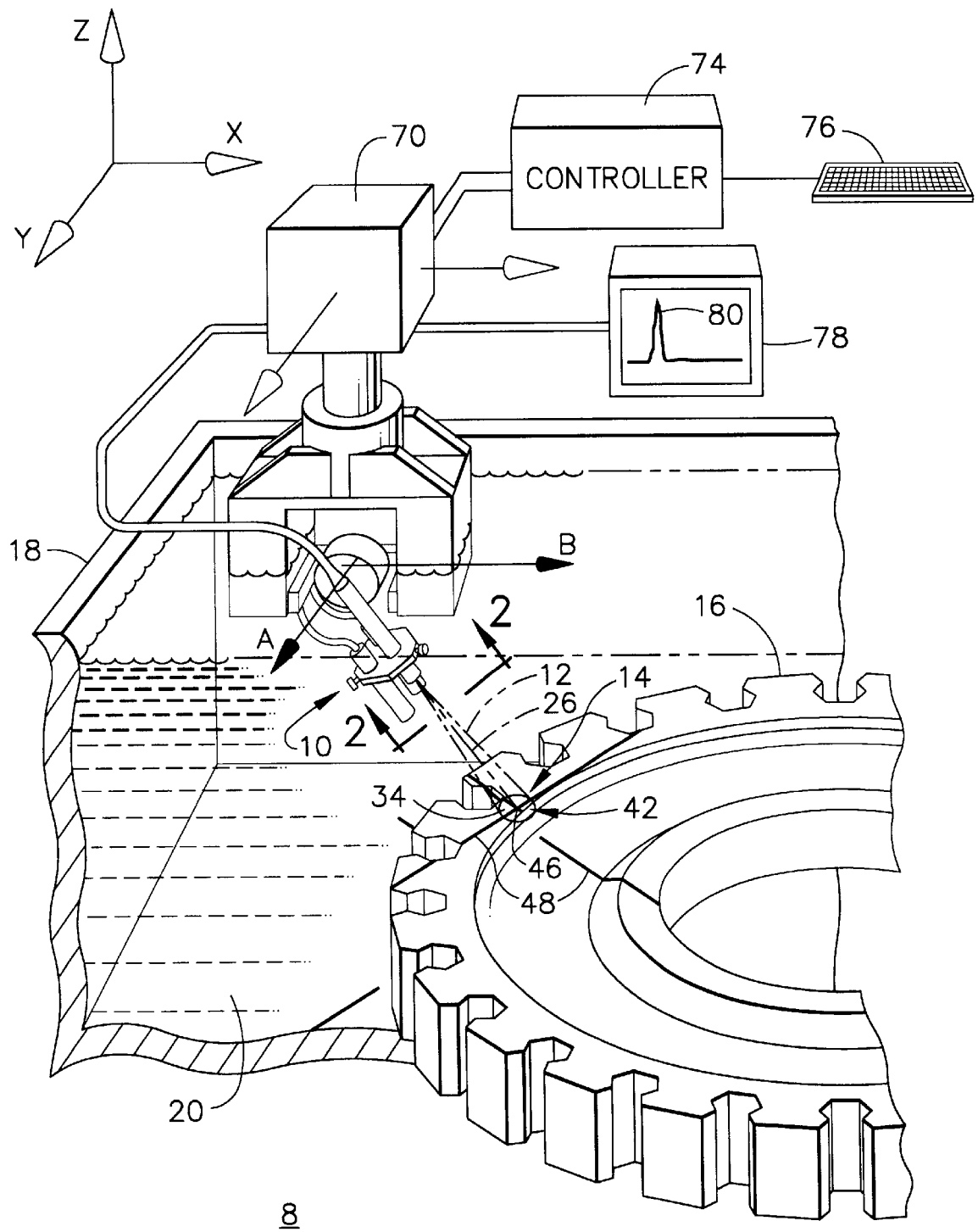
FIG. 1 is a partially schematic partially perspective view of an ultrasonic inspection system including an ultrasonic beam aiming apparatus in accordance with an exemplary embodiment of the present invention.
Figure 1A:
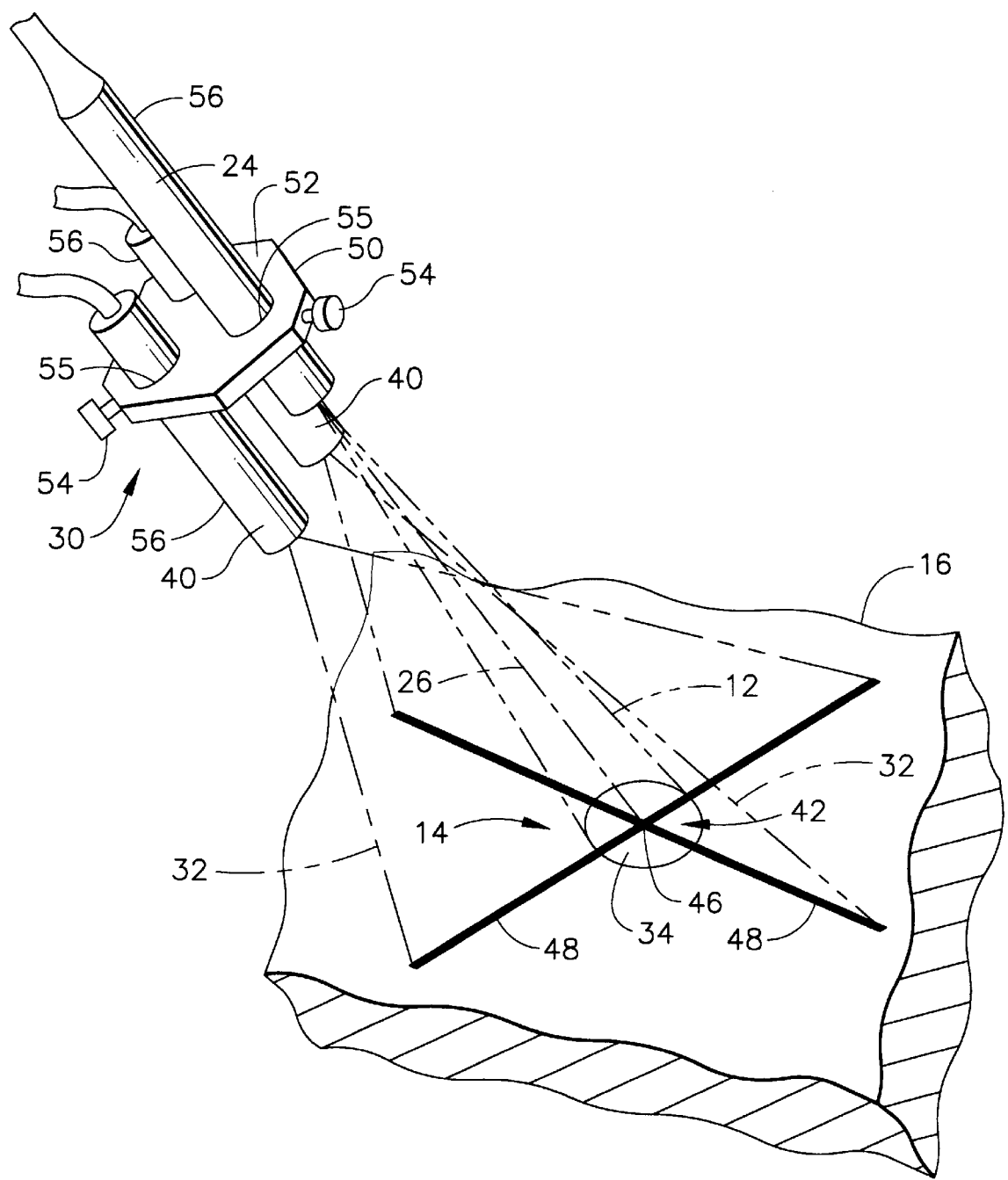
FIG. 1A is an enlarged perspective view of the ultrasonic beam aiming apparatus in FIG. 1 projecting on a flat surface.

Referring now to the drawings in detail, wherein identical numerals indicate the same elements throughout the figures. FIGS. 1 and 1A illustrate an NDE ultrasonic scanning system 8 including an exemplary embodiment of the present invention, an ultrasonic apparatus 10 for aiming an ultrasonic beam 12 to nondestructively test an examination area 14 on an object 16. The object 16 is illustrated as a gas turbine engine disk in a tank 18 of the NDE ultrasonic scanning system 8 filled with fluid 20 which is typically water. The apparatus 10 has an ultrasonic transducer 24 for generating the ultrasonic beam 12 which has a beam axis 26 and impinges the ultrasonic beam upon the object 16.

The apparatus 10 includes a laser aiming assembly 30 for directing in a first embodiment of the present invention, preferably, two fan type intersecting laser beams 32 forming a laser sight line 34 along their intersection substantially coaxial with the ultrasonic beam axis 26. Two laser beam devices, commercially available laser line generators 40, are to generate the intersecting laser beams 32. These type of laser line generators 40 are available from manufacturers such as Applied Laser Systems of Grants Pass, Oregon which makes such fan type beam generators also referred to as Visible Laser Line Generators such as their model VLM™3 Style LG.

The laser aiming assembly 30, in this embodiment of the invention, generates a laser beam cross-hair 42 having a center 46 projecting onto the examination area 14 on the object 16 along the laser sight line 34. The two laser line generators 40 form a like number of laser beam cross-hair lines 48 that intersect along the laser sight line 34. The two laser line generators 40 are shown oriented to project the two laser beam cross-hair lines 48 perpendicular to each other but any angle between them may be used so long as they are positioned to intersect along the beam axis 26 of the ultrasonic beam 12.

Figure 2:
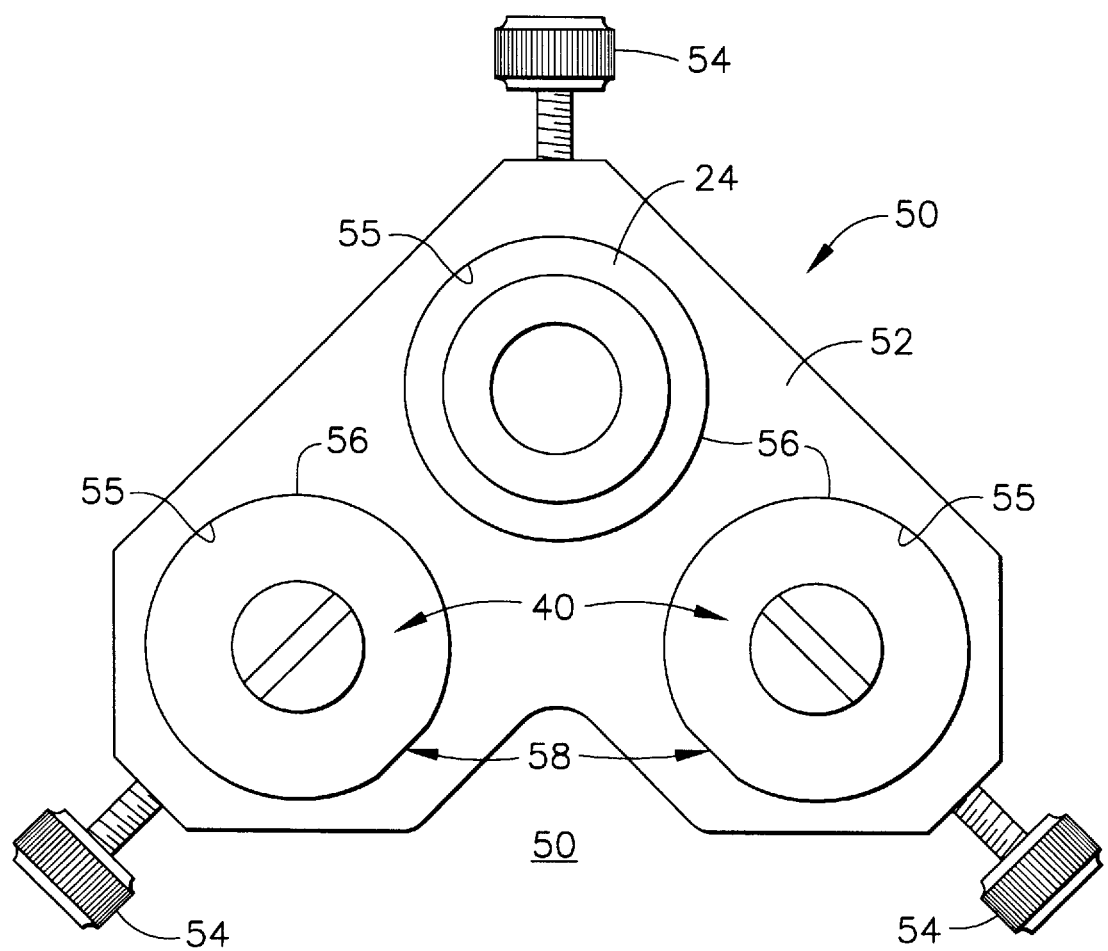
FIG. 2 is an elevated view along 2—2 in FIG. 1 of a holder for holding an ultrasonic beam transducer and laser beam generating devices.

A holder 50, shown more particularly in FIG. 2, includes a plate 52 with an attachment means in the form of set screws 54, or any other appropriate attaching apparatus, for attaching the holder to the ultrasonic transducer 24. The plate 52 has three circular apertures 55 in which cylindrical housings 56 of the transducer 24 and the laser line generators 40 are disposed. The plate 52 also supports the two laser line generators 40 which are also secured to the plate by other set screws 54 or any other appropriate attaching apparatus. Rotational securing means for fixing angular orientations of the cylindrical housings in the form of flats 58 are on the cylindrical housings 56 and the apertures 55.

Figure 3:
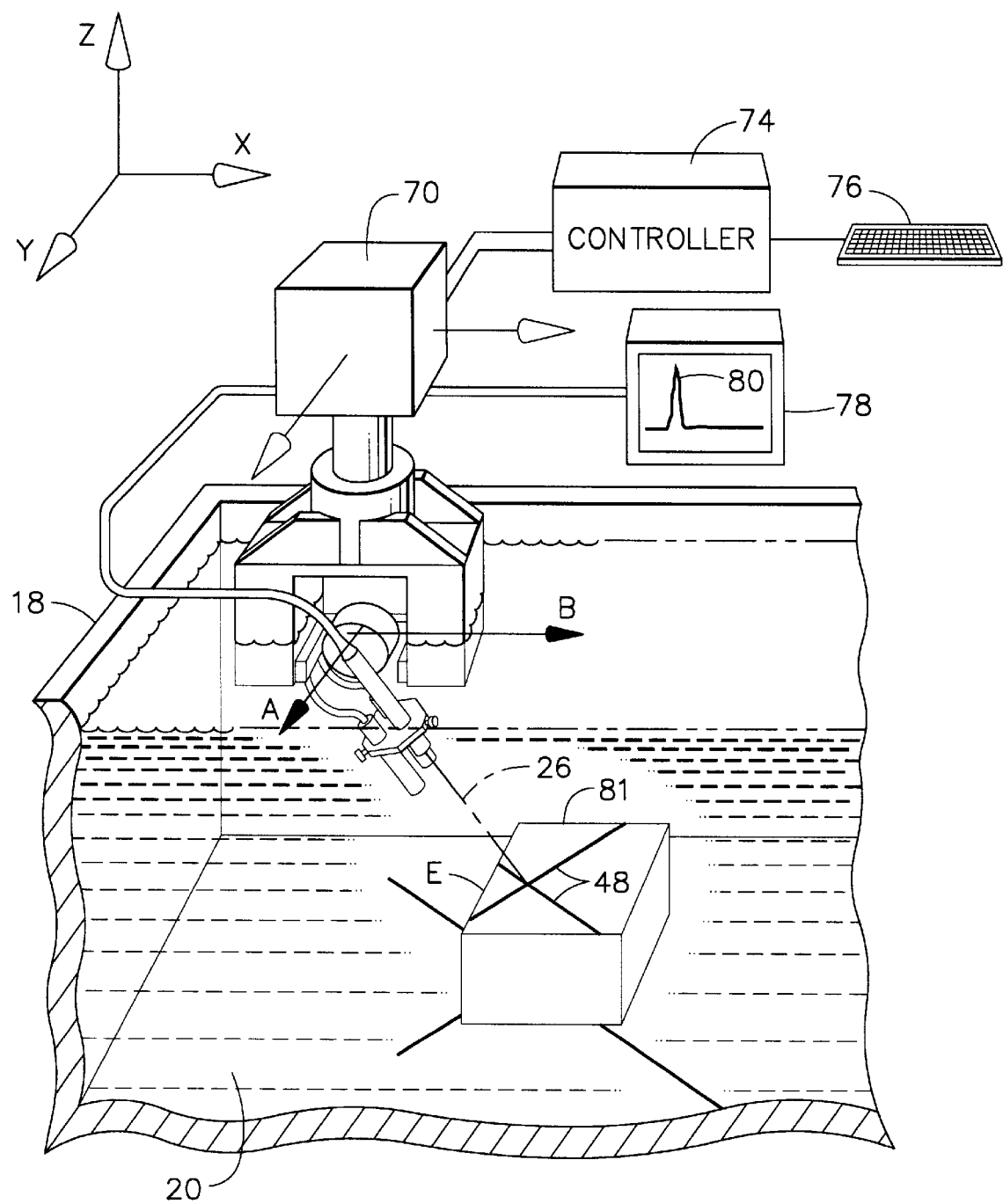
FIG. 3 is a partially schematic partially perspective view of the ultrasonic inspection system in FIG. 1 shown together with a calibration block used to align the ultrasonic beam aiming apparatus in accordance with an exemplary embodiment of the present invention.

Referring more specifically to FIG. 1, a carrier 70 with a multi axis motive means for translating the ultrasonic apparatus 10 in the X, Y and Z directions as well as rotating the apparatus 10 about A and B axes as indicated is used to aim the ultrasonic beam 12 to on the examination area 14. The movement of the carrier 70 may be controlled by a controller 74 with the use of a keyboard 76 operated by a user. The ultrasonic transducer 24 generates the ultrasonic beam 12 and picks up its return signal which is then converted into an electronic signal in the form of a voltage sent to the oscilloscope 78 which produces a visual signal that indicates an anomaly by a spike 80 on the scope 78. The laser beam cross-hair 42 helps the operator to quickly and accurately direct the ultrasonic beam 12 to the examination area 14. Referring to FIG. 3, the accuracy of the alignment between the laser beam cross-hair 42 and the ultrasonic beam 12 can be checked by placing the laser beam cross-hair at a known anomaly such as the edge E of a rectilinear bar 81 and checking to see if the oscilloscope 78 shows the spike 80.

Figure 4:
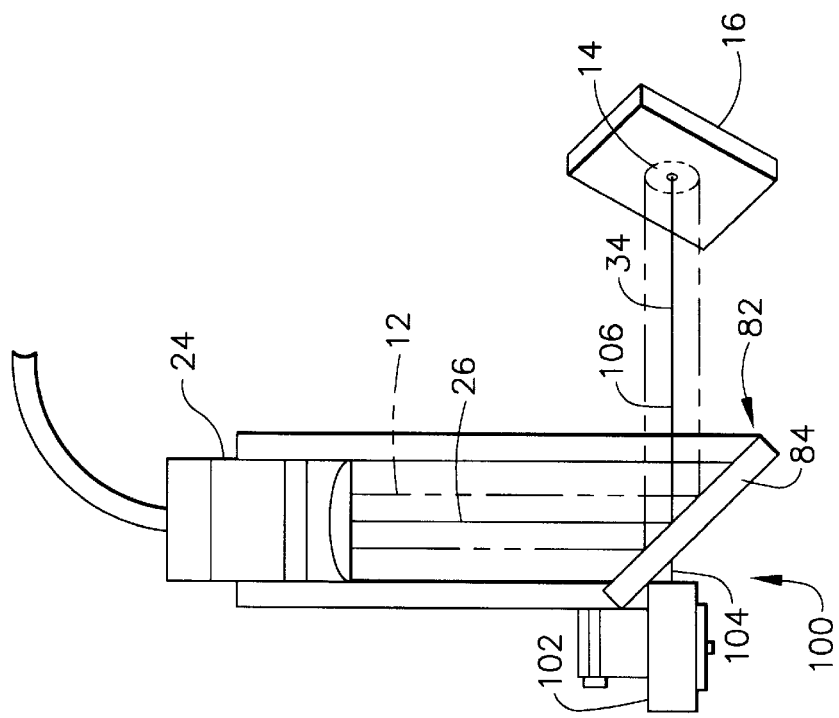
FIG. 4 is a cross-sectional view of one alternative ultrasonic beam aiming apparatus.

Another embodiment of the present invention is illustrated in FIG. 4 and has a mounting apparatus 100 used to mount the ultrasonic transducer 24 and a single laser point beam generator 102, commonly referred to as a laser beam pointer, for generating a point laser beam 104 of substantially small and preferably substantially circular cross-section having a beam centerline 106 which is the laser sight line 34. The ultrasonic transducer 24 and the laser point beam generator 102 are mounted to generate preferably co-planar point laser and ultrasonic beams 104 and 12 having the respective laser sight line 34 and ultrasonic beam axis 26 initially at a preferably right angle. An ultrasonic mirror apparatus 82 is used to for bending the ultrasonic beam 12 and in the exemplary embodiment has a mirror 84 made of a material that is substantially transparent to the point laser beam 104. The mounting apparatus is used for initially directing the single point laser beam 104 and the ultrasonic beam 12 along two different co-planar axes, the laser sight line 34 and the ultrasonic beam axis 26, on opposite sides of the mirror 84 and to set the mirror to bend the ultrasonic beam 12 so as to align,the ultrasonic beam axis 26 with the point laser beam centerline 106 or laser sight line 34 so that the point laser beam and ultrasonic beam axes are substantially coaxial at the object 16. The mirror 84 may be made of quartz such as glass and a spherically focused laser diode may be used in the point beam generator 102 for generating the laser beam with a circular cross-section. This embodiment is particularly useful in situations where ultrasonic mirrors are used to change the direction of the ultrasonic beam for various reasons such as to achieve the desired water path in a confined space.

Figure 5:
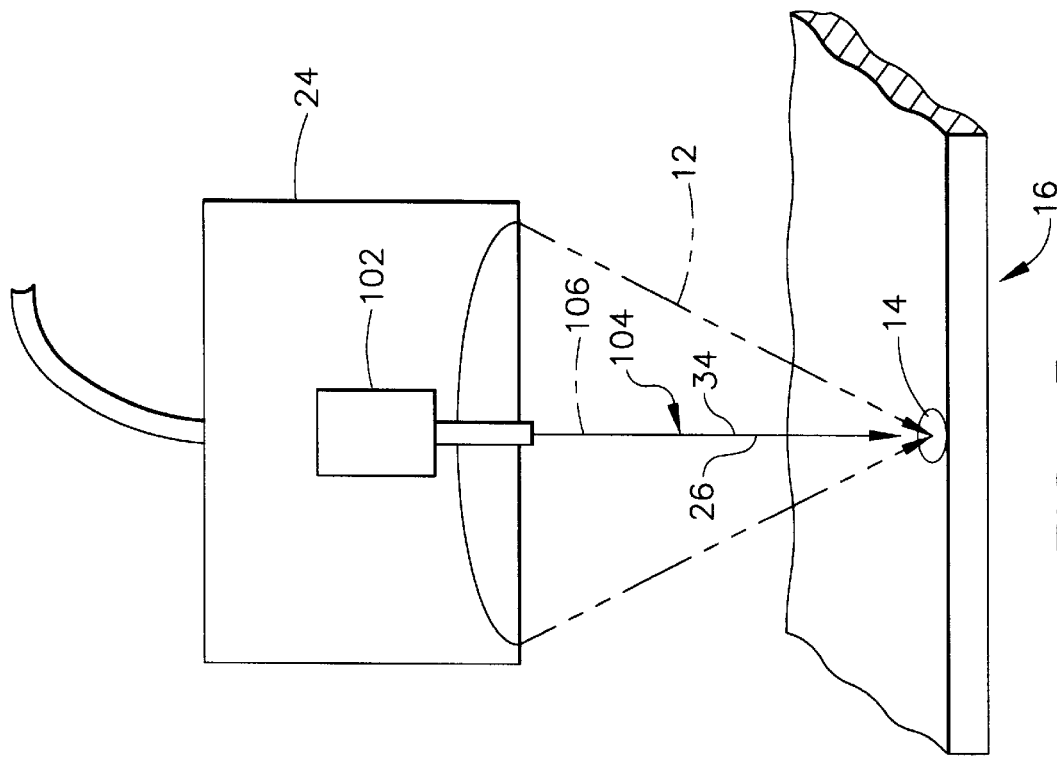
FIG. 5 is a cross-sectional view of another alternative ultrasonic beam aiming apparatus.

This purpose also may be served by yet another embodiment of the present invention which is illustrated in FIG. 5 which has the single laser point beam generator 102 mounted within the ultrasonic transducer 24 so as to generate the point laser beam 104 and ultrasonic beam 12 so that the beam centerline 196, which is the laser sight line 34, and the ultrasonic beam axis 26 are aligned and substantially coaxial at the object 16.

The invention may be in the form of an ultrasonic scanning apparatus having a carrier with a multi axis motive apparatus to direct the ultrasonic beam to nondestructively test an object and the carrier has mounted upon it the ultrasonic transducer and any other the above described laser aiming apparatus for generating at least one laser beam and a laser sight line substantially coaxial with the ultrasonic beam axis.

While, the preferred embodiment of our invention has been described fully in order to explain its principles, it is understood that various modifications or alterations may be made to the preferred embodiment without departing from the scope of the invention as set forth in the appended claims.

What is claimed is:

1. An apparatus for aiming an ultrasonic beam to nondestructively test an object, comprising:

an ultrasonic transducer means for generating the ultrasonic beam and impinging the ultrasonic beam upon the object;

said ultrasonic beam having a beam axis;

a laser aiming means for directing at least one laser beam having a laser sight line substantially coaxial with said ultrasonic beam axis.

2. An apparatus as claimed in claim 1 where in said laser aiming means comprises a cross-hair means for generating a laser beam cross-hair having a center along said laser sight line.

3. An apparatus as claimed in claim 2 wherein said cross-hair means comprises at least two laser beam devices to form a like number of laser beam cross-hair lines that intersect along said laser line.

4. An apparatus as claimed in claim 3 wherein said laser beam devices produce laser fan beams.

5. An apparatus as claimed in claim 4 further comprising a holder having an attachment means for attaching said holder to said ultrasonic transducer means and a securing means for securing said laser beam devices to said holder.

6. An apparatus as claimed in claim 5 wherein said holder comprises a plate and said transducer and laser beam devices have cylindrical housings which are disposed in circular apertures in said plate.

7. An apparatus as claimed in claim 6 further comprising a rotational securing means for fixing angular orientations of said cylindrical housings of said laser beam devices in said apertures.

8. An apparatus as claimed in claim 7 wherein said rotational securing means comprises flats on said cylindrical housings and said apertures in said plate.

9. An apparatus as claimed in claim 1 wherein said laser aiming means further comprises:

an ultrasonic mirror means for bending said ultrasonic beam;

said ultrasonic mirror means having a mirror made of a material that is substantially transparent to said laser beam;

a mount having a mounting means for initially directing a single laser beam and said ultrasonic beam along two different co-planar axes on opposite sides of said mirror; and said mirror set to bend and align said ultrasonic beam axis with said laser beam axis so that said laser beam and ultrasonic beam axes are substantially coaxial at the object.

10. An apparatus as claimed in claim 9 wherein said mirror is made of quartz.

11. An apparatus as claimed in claim 10 further comprising a spherically focused laser diode in a laser beam generator means for generating said laser beam with a circular cross-section.

12. An apparatus as claimed in claim 1 wherein said laser aiming means further comprises:

a single laser point generator means for generating a single laser beam mounted within a ultrasonic transducer housing of said ultrasonic transducer means; and a mounting means for directing the single laser beam and said ultrasonic beam substantially along a single axis.

13. An ultrasonic scanning apparatus comprising:

a carrier having a multi axis motive means to direct an ultrasonic beam to nondestructively test an object;

said carrier having mounted upon it an ultrasonic transducer means for generating the ultrasonic beam and impinging the ultrasonic beam upon the object;

said ultrasonic beam having a beam axis;

a laser aiming means for generating at least one laser beam and a laser sight line substantially coaxial with said ultrasonic beam axis.

14. An apparatus as claimed in claim 13 where in said laser aiming means comprises a cross-hair means for generating a laser beam cross-hair having a center along said laser sight line.

15. An apparatus as claimed in claim 14 wherein said cross-hair means comprises at least two laser beam devices which produce laser fan beams to form a like number of laser beam cross-hair lines that intersect along said laser line.

16. An apparatus as claimed in claim 15 further comprising a holder having an attachment means for attaching said holder to said ultrasonic transducer means and a securing means for securing said laser beam devices to said holder.

17. An apparatus as claimed in claim 16 wherein said holder comprises a plate and said transducer and laser beam devices have cylindrical housings which are disposed in circular apertures in said plate.

18. An apparatus as claimed in claim 17 further comprising a rotational securing means for fixing angular orientations of said cylindrical housings of said laser beam devices in said apertures.

19. An apparatus as claimed in claim 13 wherein said laser aiming means further comprises:

an ultrasonic mirror means for bending said ultrasonic beam;

said ultrasonic mirror means having a mirror made of a material that is substantially transparent to said laser beam;

a mount having a mounting means for initially directing a single laser beam and said ultrasonic beam along two different co-planar axes on opposite sides of said mirror; and said mirror set to bend and align said ultrasonic beam axis with said laser beam axis so that said laser beam and ultrasonic beam axes are substantially coaxial at the object.

20. An apparatus as claimed in claim 19 wherein said mirror is made of quartz.

21. An apparatus as claimed in claim 20 further comprising a spherically focused laser diode in a laser beam generator means for generating said laser beam with a circular cross-section.

* * * * *